United States Patent
Sethi et al.

(10) Patent No.: US 9,832,661 B2
(45) Date of Patent: Nov. 28, 2017

(54) ACCESS POINT MANAGEMENT

(75) Inventors: Gurdev S Sethi, Kirkland, WA (US);
David S Callahan, Mukilteo, WA (US);
Mitchell G Lacey, Bellevue, WA (US);
Kirk M Brackebusch, Duvall, WA (US); Aravind K Seshadri, Redmond, WA (US); Manish V Tangri, Redmond, WA (US); Mohanraj Dharmarajan, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1086 days.

(21) Appl. No.: 11/090,263

(22) Filed: Mar. 25, 2005

(65) Prior Publication Data

US 2006/0215668 A1   Sep. 28, 2006

(51) Int. Cl.

| | | |
|---|---|---|
| G06Q 10/00 | (2012.01) |
| H04W 24/02 | (2009.01) |
| H04L 12/54 | (2013.01) |
| H04L 12/24 | (2006.01) |
| H04L 12/26 | (2006.01) |
| H04L 29/08 | (2006.01) |
| H04W 24/08 | (2009.01) |
| H04W 88/08 | (2009.01) |

(52) U.S. Cl.
CPC ......... H04W 24/02 (2013.01); H04L 12/5692 (2013.01); H04L 41/18 (2013.01); H04L 43/16 (2013.01); H04L 67/303 (2013.01); H04W 24/08 (2013.01); H04W 88/08 (2013.01)

(58) Field of Classification Search
USPC .............................................. 705/7.11, 14.57
See application file for complete search history.

(56) References Cited

U.S. PATENT DOCUMENTS

| | | |
|---|---|---|
| 5,978,380 A | 11/1999 | Kobayashi et al. |
| 6,629,266 B1 | 9/2003 | Harper et al. |
| 6,810,018 B2 | 10/2004 | Paranchych et al. |
| 7,028,212 B1 | 4/2006 | Nair et al. |
| 7,162,250 B2 | 1/2007 | Misra |

(Continued)

OTHER PUBLICATIONS

Design, development and implementation of the registration server for NetTraveler middleware system by Ensenat-Acevedo, Jose F., M.S., University of Puerto Rico, Mayaguez (Puerto Rico), 2004, 77 pages; AAT 1421819.*

(Continued)

*Primary Examiner* — Mark A Fleischer
(74) *Attorney, Agent, or Firm* — Schwegman Lundberg & Woessner, P.A.

(57) ABSTRACT

Access point management is described. In an implementation, a method includes selecting one of a plurality of clients, in which each of the clients has a client profile which describes the client's experience with one or more of a plurality of access points. The selecting is performed based on one or more of the client profiles. A determination is made as to whether at least one of the access points utilized by the selected client should be replaced by another one of the access points. The determination includes establishing whether a difference between a connectivity score for the at least one access point and a connectivity score for the other access point exceeds an inertia value.

20 Claims, 5 Drawing Sheets

(56) References Cited

U.S. PATENT DOCUMENTS

| | | |
|---|---|---|
| 7,222,175 B2 | 5/2007 | Knauerhase et al. |
| 7,324,553 B1 | 1/2008 | Varier et al. |
| 7,366,144 B2 | 4/2008 | Kamerman et al. |
| 7,406,319 B2 | 7/2008 | Kostic et al. |
| 7,522,518 B1 | 4/2009 | Satapathy |
| 7,840,695 B2 | 11/2010 | Sethi et al. |
| 2002/0064149 A1* | 5/2002 | Elliott et al. ............ 370/352 |
| 2002/0069284 A1* | 6/2002 | Slemmer ......... H04L 12/2856 |
| | | 709/227 |
| 2002/0110105 A1 | 8/2002 | Awater et al. |
| 2003/0195967 A1* | 10/2003 | Selgas et al. ............ 709/228 |
| 2003/0208533 A1* | 11/2003 | Farquharson et al. ...... 709/203 |
| 2003/0210672 A1 | 11/2003 | Cromer et al. |
| 2003/0212787 A1 | 11/2003 | Qiu et al. |
| 2004/0001467 A1 | 1/2004 | Cromer et al. |
| 2004/0029529 A1 | 2/2004 | Kobayakawa et al. |
| 2004/0052248 A1 | 3/2004 | Frank et al. |
| 2004/0081144 A1 | 4/2004 | Martin et al. |
| 2004/0103150 A1* | 5/2004 | Ogdon et al. ............ 709/205 |
| 2004/0177137 A1 | 9/2004 | Manzardo |
| 2004/0177144 A1* | 9/2004 | Yip .................. H04L 29/06 |
| | | 709/225 |
| 2005/0021744 A1* | 1/2005 | Haitsuka et al. ............ 709/224 |
| 2005/0027840 A1 | 2/2005 | Theobold et al. |
| 2005/0060319 A1 | 3/2005 | Douglas et al. |
| 2005/0135316 A1* | 6/2005 | Cromer .............. H04L 47/767 |
| | | 370/338 |
| 2005/0192957 A1* | 9/2005 | Newbold .................. 707/5 |
| 2006/0178923 A1 | 8/2006 | Ricketts |
| 2006/0209677 A1* | 9/2006 | McGee .............. H04L 12/44 |
| | | 370/216 |

OTHER PUBLICATIONS

A treasure trove of products and services Anonymous. Security Management. Arlington: Nov. 2003. vol. 47, Iss. 11; p. 94.*
Office action for U.S. Appl. No. 12/903,745, dated Aug. 10, 2012, Sethi et al., "Capacity Management," 18 pages.
Office action for U.S. Appl. No. 12/903,745, dated Feb. 6, 2013, Sethi et al., "Capacity Management", 16 pages.
Office action for U.S. Appl. No. 12/903,745, dated Jun. 20, 2013, Sethi et al., "Capacity Management", 14 pages.

* cited by examiner

ACCESS POINT MANAGEMENT

TECHNICAL FIELD

The present invention generally relates to access points and more particularly relates to access point management.

BACKGROUND

Access points may be utilized to provide a wide variety of functionality. For example, an access point may be utilized to provide access to a wireless network, such as to a user of a wireless phone. In another example, the user may utilize a laptop computer having a modem that is configured to achieve a dial-up connection with an Internet service provider over a traditional telephone line, and thereby gain access to the Internet. As shown by these examples, the user may also utilize a variety of computing devices when accessing the access points, such as desktop personal computers, personal digital assistants, wireless phones, game consoles, and so on. Additionally, the user may access a variety of access points from a variety of locations.

Because of the variety of locations that may be utilized by the user, a service provider may provide a plurality of access points which are available for access by the user from the differing locations. Additionally, because a large number of similar users may also desire access, the service provider may include a plurality of access points for access at each of the differing locations. Further, each of the users may utilize one or more of a variety of computing devices to access the access point. Consequently, the service provider may be faced with a daunting task of managing which clients access which access points. Management of the access points may be further complicated as a variety of different factors may have to be taken into account in the management of the access points, such as costs for providing the access point, capacity limits, and so on.

Therefore, there is a continuing need for improved management techniques for access points.

SUMMARY

Access point management is described. In an implementation, a method includes selecting one of a plurality of clients, in which each of the clients has a client profile which describes the client's experience with one or more of a plurality of access points. The selecting is performed based on one or more of the client profiles. A determination is made as to whether at least one of the access points utilized by the selected client should be replaced by another one of the access points. The determination includes establishing whether a difference between a connectivity score for the at least one access point and a connectivity score for the other access point exceeds an inertia value.

In another implementation, a method includes managing use of a plurality of access points by a plurality of clients by processing data according to one or more business rules to achieve a connectivity score for each of the access points. A plurality of access point lists is formed, in which access point list is for communication to a respective one of the clients and references at least one of the access points for use by the client based on a respective connectivity score.

BRIEF DESCRIPTION OF THE DRAWINGS

The same reference numbers are utilized in instances in the discussion to reference like structures and components.

DETAILED DESCRIPTION

Overview

Figure 1:
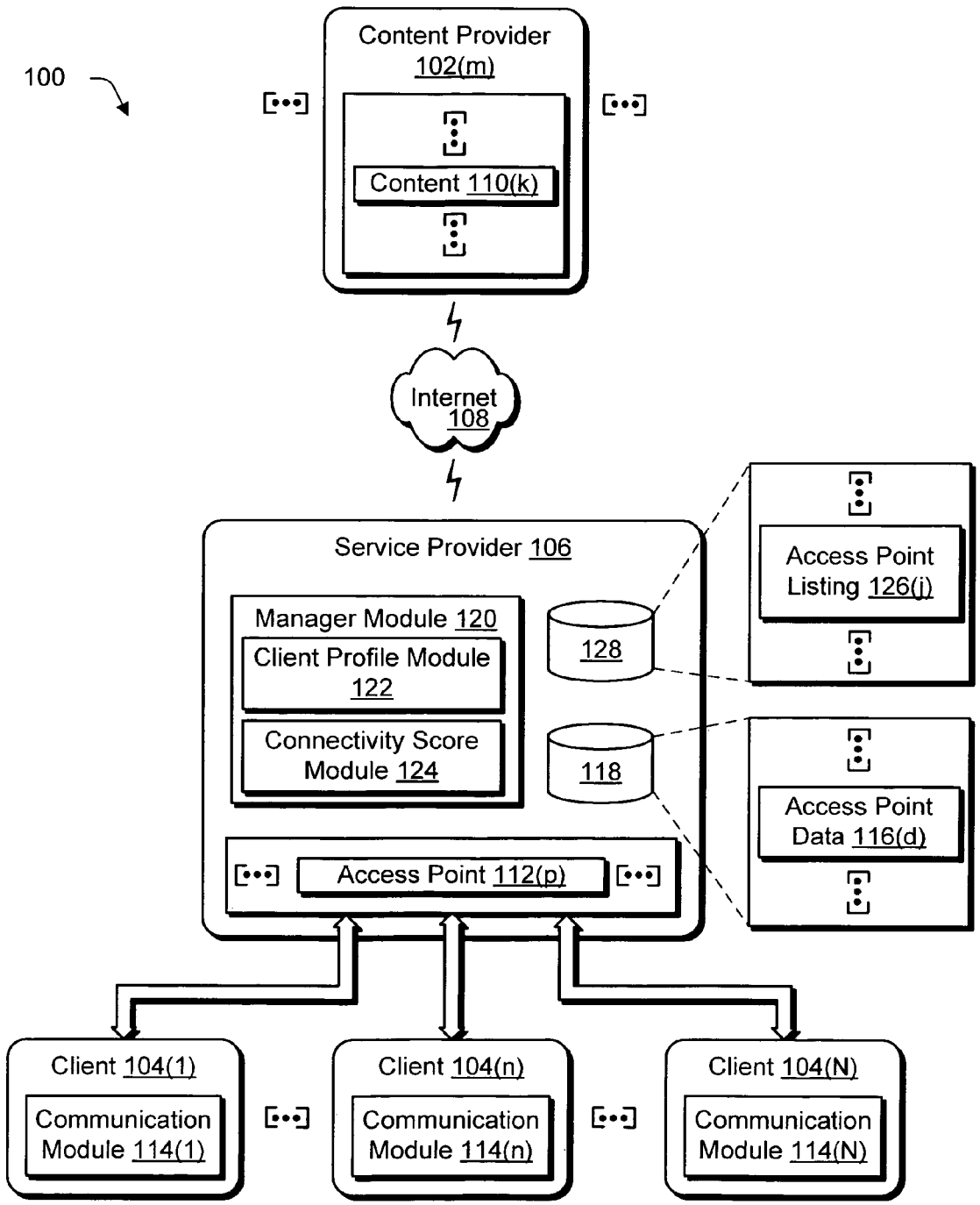
FIG. 1 is an illustration of an environment in an exemplary implementation that is operable to employ techniques for managing access points.

Access point management is described. A service provider may provide a multitude of access points for use by a multitude of users. A bad access experience, however, may result in user dissatisfaction with the access point, and therefore cause the user to subscribe to a competitor's service. For example, a user may utilize a telephone number to access an Internet service provider, and may encounter hang-ups and broken connections that are associated with the telephone number. This dissatisfaction made lead the customer to subscribe to a competitor's service, which results in lost market share and revenue of the service provider and frustration on the part of the customer. However, a cost of changing the access point may be prohibitive and viewed as overly burdensome by a portion of the users which utilize the access point, especially in instances in which each user does not have the same experience with the access point. For instance, a first user may experience a reliable connection when accessing an access point. A second user, however, may experience broken connections with that same access point. Therefore, moving both the first user and the second user to a new access point may be needlessly complicated, and viewed as overly burdensome by the first user which had a reliable connection experience and was "happy" with the original access point.

In an implementation, management techniques are described for managing access points. For example, the management techniques may be implemented by a manager module which is executable to provide an intelligent access point assignment mechanism for determining which clients are assigned to which access points. The manager module, for instance, may examine a plurality of client profiles. Each of the client profiles describes the client's experience with one or more access points. The clients may then be ordered based on the client profiles from "unhappy" (e.g., those clients which experience multiple failures when using the access point) to "happy" (e.g., those clients having success using the access point). The manager module may then process the clients in order of the quality of their connection experience, e.g., from "unhappy" to "happy".

A current access point utilized by the client is compared to an alternative access point. If as a result of the comparison, the alternative access point is better than the current access point by at least an inertia value, a switch is made from the current access point to the alternative access point.

In this implementation, the inertia value may thus provide a threshold such that at least a minimum amount of "improvement" in the connection is realized before the switch is made. In this way, clients are not reassigned that would not realize this minimum amount of improvement. Further discussion of the use of the inertia value may be found in relation to FIGS. 3-5.

In the following discussion, an exemplary environment is first described which is operable to employ the access point management techniques. Exemplary procedures are then described which may be employed in the exemplary environment, as well as in other environments.

Exemplary Environment

FIG. 1 is an illustration of an environment 100 in an exemplary implementation that is operable to employ techniques for managing access points. The illustrated environment 100 includes a plurality of content providers 102(m) (where "m" can be any integer from one to "M"), a plurality of clients 104(1), ..., 104(n), ..., 104(N), and a service provider 106. The clients 104(1)-104(N) may be configured in a variety of ways for accessing the service provider 106. For example, one or more of the clients 104(1)-104(N) may be configured as a computing device, such as a desktop computer, a mobile station, an entertainment appliance, a set-top box communicatively coupled to a display device, a wireless phone, a game console, and so forth. Thus, the clients 104(1)-104(N) may range from full resource devices with substantial memory and processor resources (e.g., personal computers, game consoles) to low-resource devices with limited memory and/or processing resources (e.g., traditional set-top boxes, hand-held game consoles). The clients 104(1)-104(N) may also relate to a person and/or entity that operate the clients. In other words, one or more of the clients 104(1)-104(N) may describe logical clients that include users, software, and/or devices.

The content provider 102(m) is illustrated as being communicatively coupled to the service provider 106 over a network configured as the Internet 108. Although the network is illustrated as the Internet 108, the network may assume a wide variety of configurations. For example, the network may include a wide area network (WAN), a wireless network, and so on. Further, although a single network is shown, the network may be configured to include multiple networks for access to the Internet 108, such as a corporate intranet that is configured to include a gateway to the Internet, and so on. A wide variety of other instances are also contemplated.

The content provider 102(m) includes a plurality of content 110(k), where "k" can be any integer from one to "K", which is available for access over the Internet 108. The content provider 102(m) may provide a variety of functionality for distribution and management of the content 110(k), such as digital rights management, payment processing, location and communication of the content 110(k), and so on.

To gain access to the content 110(k) over the Internet 108, each of the plurality of clients 104(1)-104(N) obtains a communicative coupling with the service provider 106 via a corresponding one of a plurality of access points 112(p), where "p" can be any integer from one to "P". The access points 112(p) may be configured in a variety of ways to provide access to the service provider 106. For example, each access point 112(p) may provide a plurality of telephone numbers for "dial-up" access, each access point may correspond to a single telephone number, one or more of the access points 112(p) may be a wireless access point to provide a wireless communicative coupling (e.g., via a wireless wide area network (WAN), wireless telephone network for placing a wireless telephone call), a data distribution point for access by a computing device, an internet protocol (IP) address, and so on. Additionally, assignment of the access points may be dynamically determined, and as such, the assignment of the access points is not limited to a "static" group of access points.

In the illustrated implementation, each of the access points 112(p) is configured to provide one or more "dial-up" access numbers for accessing the service provider 106 over a telephone network. For example, each of the clients 104(1), 104(n), 104(N) may include a respective one of a plurality of communication modules 114(1), 114(n), 114(N). For instance, communication module 114(n), when executed by client 104(n), may utilize access point 112(p) to attempt access with the service provider 106.

Data describing the attempted access may be stored by the service provider as "access point data" 116(d), where "d" can be integer from one to "D", in a database 118. The access point data 116(d) may be obtained by the service provider 106 in a variety of ways. For example, the service provider 106 may obtain client logs from each of the clients 104(1)-104(N) when a successful connection is obtained between the clients 104(1)-104(N) and the service provider 106. Each client log may describe attempts made by the respective client 104(1)-104(N) to access the service provider 106. The access point data 116(d) may also include data obtained by the service provider 106 from other sources, such as through observation of which access points 112(p) are active, contractual capacity guaranteed by each of the access points 112(p), cost of providing each of the access points 112(p) (e.g., contractually agreed upon cost-per-hour, tiered pricing options, and so on), quality of service observed, and so forth. Thus, the access point data 116(d) may describe a plurality of characteristics of the access point 112(p), including how the access points 112(p) are configured to provide access to the clients 104(1)-104(N), experience of the clients 104(1)-104(N) with the access points 112(p), and so on.

The access point data 116(d) may be utilized by a manager module 120 in a wide variety of ways. For example, the manager module 120 is illustrated as including a client profile module 122 and a connectivity score module 124. The client profile module 122 is representative of functionality for generating a client profile for each of the clients 104(1)-104(N) which provided access point data 116(d). For instance, each client profile may describe the respective client's experience when attempting to access one or more of the access points 112(p) and may be provided as a numerical "score" for comparing the client profiles, one to another. Thus, the client profiles may be utilized to compare the experience of the clients 104(1)-104(N), one to another, and therefore identify which of the clients 104(1)-104(N), if any, has a substandard experience with one or more of the access points 112(p).

The connectivity score module 124 is representative of functionality for generating a connectivity score for each of the plurality of access points 112(p) which are described by the access point data 116(d). Therefore, the connectivity scores generated by the connectivity score module 124 may also function as a relative score for comparing the access points 112(p), one to another. Like the client profiles, the connectivity scores may also be represented as a numerical score to provide a variety of functionality. For example, the connectivity scores provide the ability to scale the influence of one or more factors in relation, one to another. Additionally, the connectivity scores may provide extensibility such that additional considerations may be easily incorporated without requiring a substantial rewrite of a procedure utilized to compute the score. Rather, each score generated by the procedure incorporating the additional consideration may be compared, one to another. Further discussion of generation of connectivity scores may be found in relation to FIG. 2.

The client profiles generated by the client profile module 122 and the connectivity scores generated by the connectivity score module 124 may be utilized by the manager module 120 to determine which of the plurality of access points 112(p) are referenced in each of a plurality of access point listings 126(j), where "j" can be any integer from one to "J", which are illustrated as stored in a database 128. For example, the manager module may determine which of the plurality of clients 104(1)-104(N) has the "lowest" client profile i.e., has the worst experience when connecting to one of more of the access points 112(p). The manager module 120 may then select another one of the access points 112(p) for inclusion (i.e., reference) in the access point listing 126(j) for communication to the client having the lowest client profile. The access point listing 126(j) references which of the plurality of access points 122(p) are to be utilized by the client. Thus, the service provider 106 may obtain an "understanding" of which of the plurality of clients 104(1)-104(N) are the least "happy", and select one or more access points 112(p) for inclusion in an access point listing 126(j) to that client. Therefore, clients which are "happy" (i.e., have a relatively good connection experience) with the access points 112(p) are not needlessly "churned", thereby improving the clients' experience with the service provider 106 and the overall profitability of the service provider 106. Further discussion of procedures utilizing client profiles and connectivity scores may be found beginning in relation of FIGS. 3-5.

Generally, any of the functions described herein can be implemented using software, firmware (e.g., fixed logic circuitry), manual processing, or a combination of these implementations. The terms "module" and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the access point management techniques described below are platform-independent, meaning that the techniques may be implemented on a variety of commercial computing platforms having a variety of processors. Although a service provider 106 configured as an internet service provider has been described, the service provider 106 may be configured to provide a wide variety of functionality through use of a plurality of access points.

Figure 2:
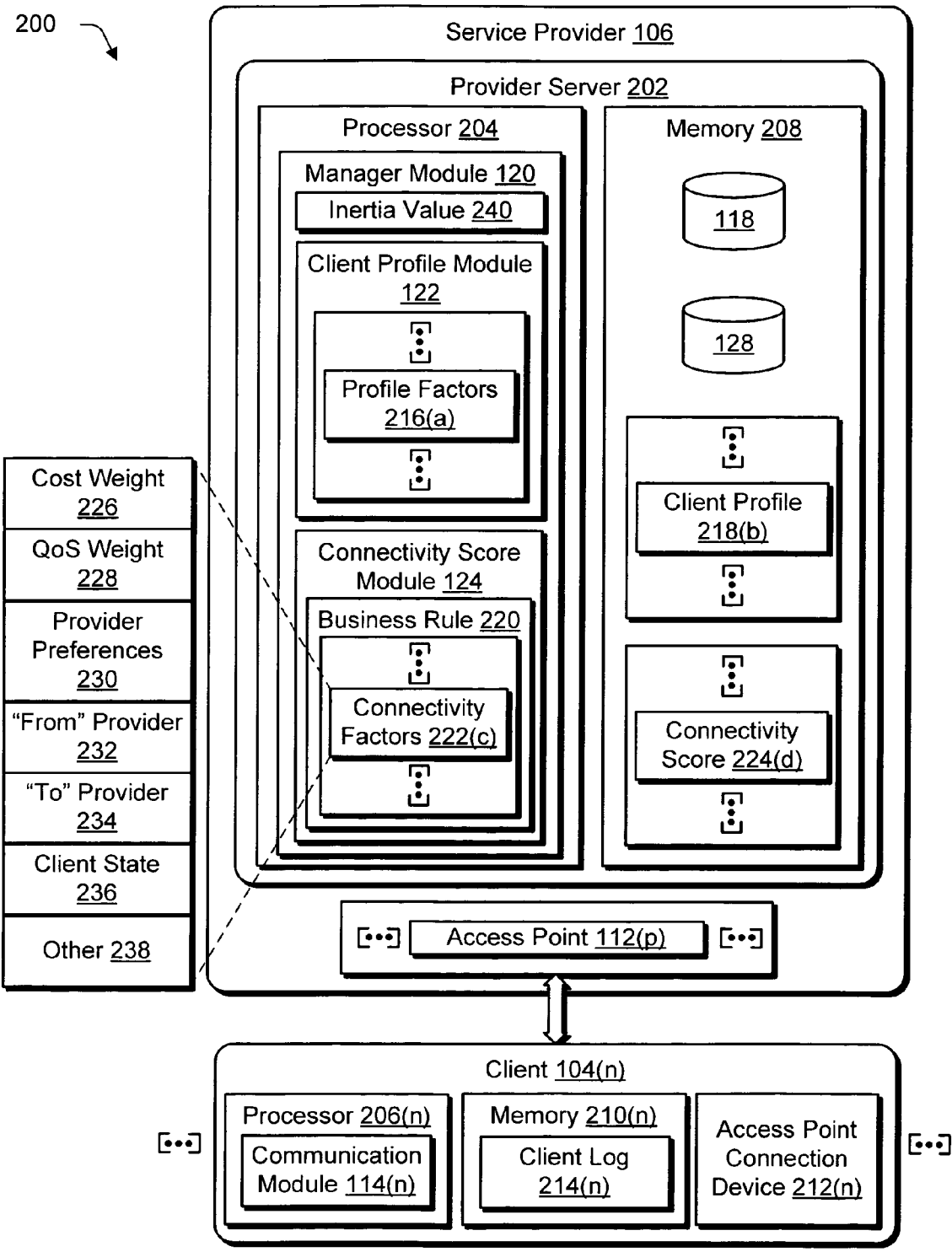
FIG. 2 is an illustration of a system in an exemplary implementation showing a plurality of clients and a service provider of FIG. 1 in greater detail.

FIG. 2 is an illustration of a system 200 in an exemplary implementation showing the plurality of clients 104(n) and the service provider 106 of FIG. 1 in greater detail. The system 200 of FIG. 2 is representative of an exemplary network environment that is configured to implement the environment 100 of FIG. 1 through use of a variety of computing devices. For example, the service provider 106 is illustrated as including a provider server 202 and the client 104(n) is illustrated as a client device. Accordingly, the provider server 202, and the client 104(n) are each illustrated as including a respective processor 204, 206(n) and a respective memory 208, 210(n).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208, 210(n) is shown, respectively, for the provider server 202 and the client 104(n), each memory 208, 210(n) may be representative of a wide variety of types and combinations of memory that may be employed, such as random access memory (RAM), hard disk memory, removable medium memory, and so forth.

The client 104(n) includes the communication module 114(n) of FIG. 2, which is illustrated as being executed on the processor 206(n) and is storable in memory 210(n). The communication module 114(n), when executed, may cause an access point connection device 212(n) to attempt a connection with the service provider 106 via one or more of the access points 112(p). The communication module 114(n) may also be executable to form a client log 214(n) which describes the connection attempts, such as when the connection was attempted, which of the plurality of access points 112(p) were attempted, a result of the attempt (e.g., successful, not successful), type of error encountered (if any), and so on. Further, the communication module 114(n) may be executed to communicate the client log 214(n) to the service provider 106 for storage in the database 118.

The manager module 120 is illustrated as being executed on the processor 204 of the provider server 202 of the service provider 106, and is storable in memory 208. The manager module 120, when executed, may obtain the client log 214(n) communicated by the client 104(n) and store the client log 214(n) in the database 118 as the access point data 116(d) of FIG. 1. As previously described, the manager module 120 may utilize the access point data 116(d) in a variety of ways.

The manager module 120, for instance, may execute the client profile module 122. The client profile module 122 is illustrated as including a plurality of profile factors 216(a), where "a" can be any integer from one to "A", which are utilized to compute a plurality of client profiles 218(b), where "b" can be any integer from one to "B". For example, the client profile module 122 may provide a user interface for permitting a network administrator to specify which of the plurality of profile factors 216(a) are to be utilized to compute the plurality of client profiles 218(b).

A variety of profile factors 216(a) may be specified, such as number of hours typically utilized by the client to access one of more of the access points 112(p), number of attempts made by the client 104(n) to access the access points 112(p) which were successful or not successful, when the attempts were made, access points 112(p) utilized for each attempt, access point connection device 212(n) utilized by the client 104(n) to perform the attempt, and so on. Weights may be assigned to one or more of the profile factors 216(a) by the network administrator to arrive at a relative value (e.g., a numerical score) for each client profile 218(b) which indicates whether the client corresponding to the client profile 218(b) is "happy" or "unhappy". For example, a positive score for the client profile 218(b) may indicate an above average connectivity experience with one or more of the access points 112(p), while a negative score for the client profile 218(b) may indicate a below average connectivity experience. Thus, the client profiles 218(b) may provide a technique for comparing the connectivity experience of the plurality of clients 104(n), one to another.

The manager module 120 may also execute the connectivity score module 124. The connectivity score module 124 is executable to implement a business rule 220 specified by the network administrator, which may include a plurality of connectivity factors 222(c), where "c" can be any integer from one to "C", for generating a plurality of connectivity scores 224(d), where "d" can be any integer from one to "D". As previously described, each connectivity score 224 (d) may correspond to one of the plurality of access points 112(p) such that the plurality of access points 112(p) may be compared, one to another. For example, each connectivity score 224(d) may include a relative value (e.g., a numerical score) which is generated based on the plurality of connectivity factors 222(c). Therefore, the network administrator may specify which of the connectivity factors 222(c) are to be utilized to generate the connectivity score 224(d), assign weights to the connectivity factors 222(c), and so on, based on a variety of considerations such that the connectivity scores 224(d) generated by the business rule 220 reflect the considerations as specified by the network adminstrator using the plurality of connectivity factors 222(c). Therefore, use of the connectivity score 224(d) may also further reflect the business rule.

The manager module 120, for instance, may utilize the connectivity score 224(d) to determine which access points 112(p) will be referenced in an access point list for communication to the client 104(n). Therefore, the selection of access points 112(p) based on the connectivity scores 224(d) may implement the business rule 220 utilized to generate the connectivity score 224(d). Further discussion of the formation of access point lists through use of connectivity scores 224(d) may be found beginning in relation to FIG. 3.

A variety of connectivity factors 222(c) may be specified for forming the business rule 220. For example, a cost weight 226 may be specified for describing how much of an effect that cost of providing the access point 112(p) is to have on the connectivity score 224(d). A quality-of-service weight 228 may also be specified for describing how much of an effect quality-of-service of the access point 112(p) is to have on the connectivity score 224(d). Provider preferences 230 may also be specified. For example, the service provider 106 may enter into contractual relationships with communication companies which provide the actual infrastructure of the access point 112(p). Therefore, the provider preferences 230 may be used to specify which of the communication companies is preferred in the computation of the connectivity score 224(d).

The connectivity factors 222(c) may also address goals which may be implemented by the business rule 220. For example, a "from" provider 232 connectivity factor may be specified such that clients using an access point of this provider are considered. Likewise, a "to" provider 234 connectivity factor may be specified such that clients will be given a preference to an access point of this provider. The client state 236 may also be considered such that clients using an access point in this state will be considered. A variety of other 238 connectivity factors may also be specified, such as "maximum hours to move" such that a new assignment of access points does not result in a movement of usage hours that exceeds this threshold value, further discussion of which may be found in relation to FIG. 5.

The manager module 120 may also utilize an inertia value 240 to determine which access points 112(p) should be referenced in an access point listing 126(j) for communication to the client 104(n). For example, the inertia value 240 may act as a threshold which describes a minimum amount of improvement that needs to be met before the client 104(n) is assigned a new access point 112(p) by the manager module 120. For instance, the manager module 120 may utilize the inertia value 240 when comparing connectivity scores 224(d) to determine whether an access point assigned to the client 104(n) should be replaced with another access point 112(p). Therefore, the inertia value 240 may be utilized to determine if the replacement is worth the "cost", e.g., use of processing, hardware, and network resources, perceived inconvenience on the part of the client 104(n), and so on.

Exemplary Procedures

The following discussion describes access point management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
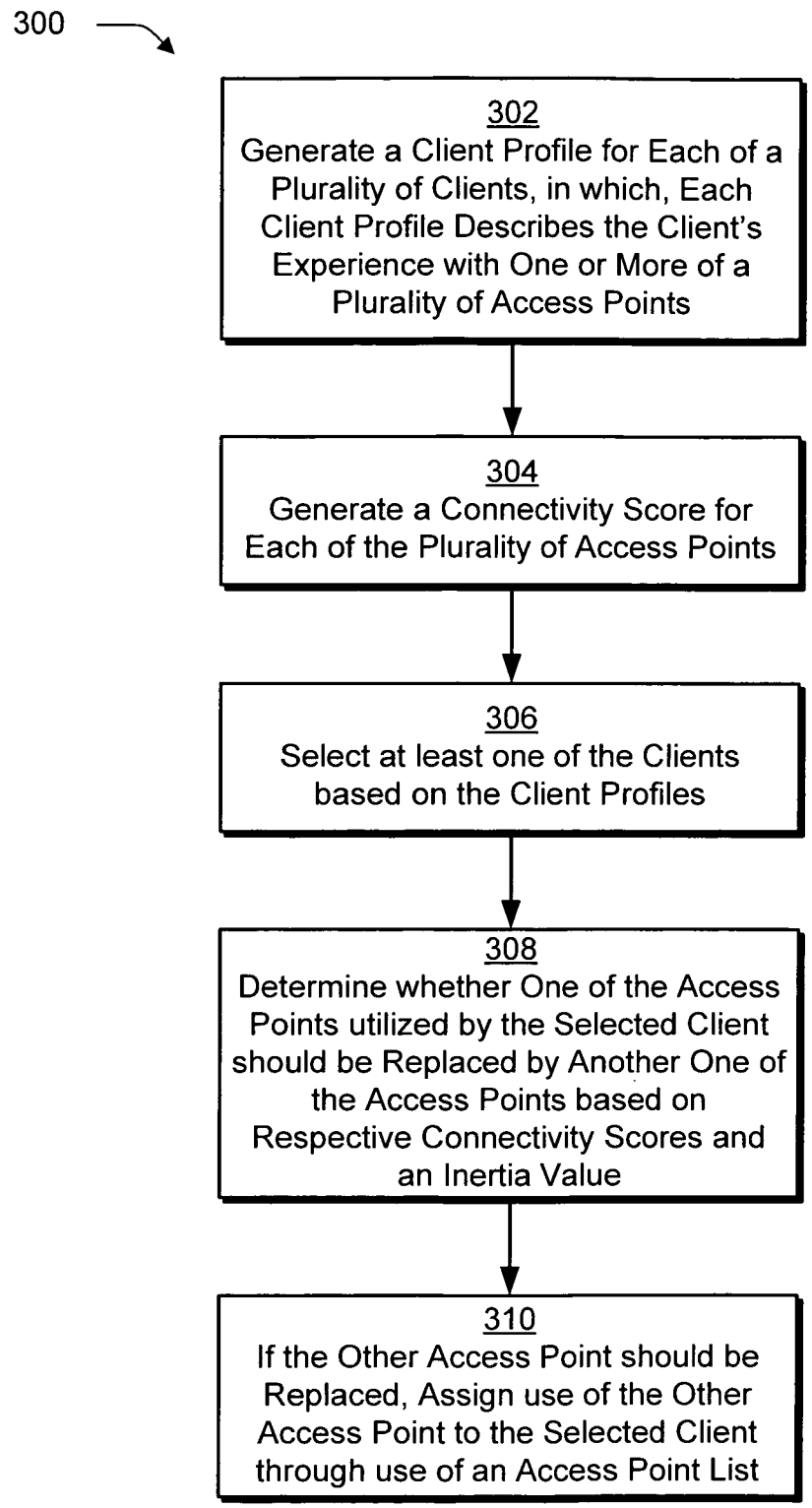
FIG. 3 is a flow diagram depicting a procedure in an exemplary implementation in which a client is selected based on comparison of client profiles to determine whether an access point utilized by the selected client should be replaced by another access point through comparison of connectivity scores for the access points.

FIG. 3 is a flow diagram depicting a procedure 300 in an exemplary implementation in which a client is selected based on comparison of client profiles to determine whether an access point utilized by the selected client should be replaced by another access point through comparison of connectivity scores for the access points. A client profile 218(b) is generated for each of a plurality of clients 104(n), in which, each client profile 218(b) describes the client's experience with one or more of a plurality of access points 112(p) (block 302). The client profile 218(b), for instance, may be generated from a client log 214(n) obtained from the client 104(n) which describes successful and failed attempts to access one or more of the plurality of access points 112(p). The client profile 218(b) may also be generated based on a variety of other data. For instance, the client profile 218(b) may be based in part on data obtained by the manager module 120 by monitoring the client's 104(n) interaction with the access point 112(p), such as number of hours the client 104(n) utilizes a particular access point 112(p), when the client 104(n) accesses the access point 112(p), and so on.

A connectivity score is generated for each of the plurality of access points 112(p) (block 304). For example, the manager module 120 may execute the connectivity score module 124 to process the access point data 116(d) utilizing a business rule 220. The business rule 220 may specify a relationship between a variety of connectivity factors 222 (c). The business rule 220, for instance, may include one or more weights which are assigned to respective one or more of the connectivity factors 222(c). The business rule 220 may be utilized to process the access point data 116(d), according to the connectivity factors 222(c) to compute a connectivity score 224(d) for each of the plurality of access points 112(p) described in the access point data 116(d). Thus, the connectivity score 224(d) may provide a technique for comparison of the access points 112(p), one to another, in light of the business rule 220.

At least one of the clients is then selected based on the client profiles (block 306). As previously described, the client profiles 218(b) may be utilized to compare the connective experience of each of the plurality of clients 104(n), one to another. Therefore, the manager module 120, when executed, may examine the plurality of client profiles 218(b)

to determine which of the plurality of clients 104(n) has a relatively worse connection experience with one or more of the access points 112(p). In this way, the profile factors 216(a) used to generate the client profile 218(b) may also describe various considerations for determining relative experience of the clients 104(n). For example, the profile factors 216(a) may be configured such that a client which has one unsuccessful attempt during a measurement interval but only attempts access three times during the measurement interval is given a lower relative client profile 218(b) than another client which has multiple unsuccessful attempts, but attempts access a significantly larger number of times during the measurement interval. Thus, a network administrator may specify relationships between the plurality of profile factors 216(a) to generate a client profile 218(b) that reflects different considerations. Additionally, the client profile and the connectivity score may address different considerations. For instant, the client profile may give a greater weight to unsuccessful attempts than the connectivity score for a particular access point, the connectivity score may address a consideration (e.g., cost) that is not addressed by the client profile (and vice versa), and so on.

A determination is then made as to whether one of the access points utilized by the selected client should be replaced by another one of the access points based on respective connectivity scores and an inertia value (block 308). For example, the connectivity scores may describe whether the access point utilized by the selected client is "better" than another one of the access points based on the connectivity scores. The inertia value may be utilized to determine if the other access point is "sufficiently better" to warrant the change. If so, use of the other access point may be assigned to the selected client through use of an access point list (block 310). For example, the access point list may be configured as a phonebook of telephone number that the client 104(n) may utilize to "dial-in" to access an Internet service provider. Therefore, by managing which telephone numbers are included in which phonebooks, the manager module 120 may manage use of the plurality of telephone numbers by the plurality of clients. For instance, the manager module may distribute use of the plurality of access points 112(p) by the plurality of clients 104(n) such that access points are not underutilized or overutilized.

Figure 4:
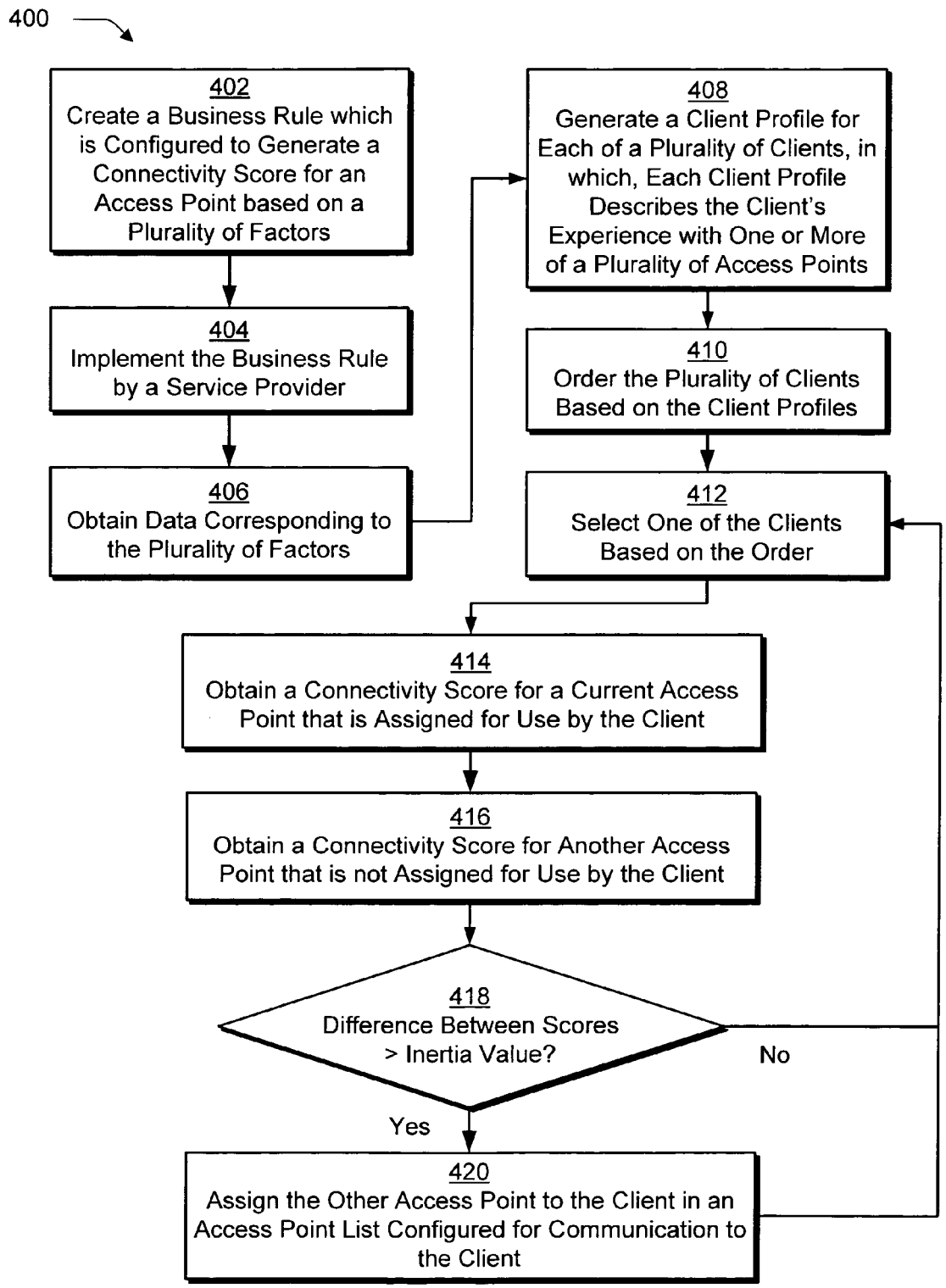
FIG. 4 is a flow diagram depicting a procedure in an exemplary implementation in which a business rule is created for generating connectivity scores which are utilized to manage access point use according to the business rule.

FIG. 4 is a flow diagram depicting a procedure 400 in an exemplary implementation in which a business rule is created for generating connectivity scores which are utilized to manage access point use according to the business rule. A business rule is created which is configured to generate a connectivity score for an access point based on a plurality of factors (block 402). For example, a network administrator may assign a weight to a cost of providing the access point and another weight for the quality of service of the access point. These weights, along with other connectivity factors specified by the network administrator, may describe a desired relationship of considerations which are to be used in deciding how the access points relate, one to another.

The business rule is then implemented by a service provider (block 404). For example, the inputs specified in creating the business rule may be implemented by a connectivity score module to generate connectivity scores which reflect the business rule.

Data is obtained which corresponds to the plurality of factors (block 406) which were specified in the business rule. For example, the connectivity score module 124 may examine access point data 116(d) which includes client logs 214(n) obtained from the plurality of clients 104(n) and obtain data which corresponds to the factors utilized to create the business rule.

A client profile is generated for each of a plurality of clients, in which, each client profile describes the client's experience with one or more of a plurality of access points (block 408). The plurality of clients is then ordered, one to another, based on the client profiles (block 410). For example, client profiles may be configured as numerical scores which describe a relative degree of satisfaction of the client's experience with the access points. Therefore, the clients (and more particularly references to the clients) may be ordered in a queue based on the numerical scores to reflect the relative degree of satisfaction.

One of the client may then be selected based on the order (block 412), such as a client is selected having a client profile describing the least relative amount of satisfaction with one or more of the access points. A connectivity score is obtained for a current access point that is assigned for use by the client (block 414).For example, the manager module 120 may query an access provider list that is configured for use by the selected client to determine which access points are to be utilized by the client. In another example, the manager module 120 may examine the client profile, which may indicate which access point is assigned for use by the client. In a further example, the manager module 120 may query a client log 214(n) obtained from the client 104(n).

A connectivity score is also obtained for another access point that is not assigned for use by the client (block 416). For example, the manager module 120 may determine which access points 112(p) are assigned for use by the client 104(n) as previously described, and then select an access point 112(p) which is not assigned for use by the client 104(n) which has the "highest" connectivity value.

A determination is then made is to whether a different between the connectivity scores for the current access point and the other access point is greater than an inertia value (decision block 418). In this way, the manager module 120 may determine if an improvement in connectivity that may be achieved by assigning the client 104(n) to utilize the other access point is "worth" reassigning the client 104(n) to utilize the access point. For instance, the connectivity score 224(d) may have a margin of error. Therefore, the inertia value 240 may be set such that if the difference is within the margin of error, the change is not made. In another instance, the connectivity score 224(d) may be set by a network administrator such that the clients 104(n) are not "churned" unless a noticeable improvement in connectivity is likely. A variety of other instances are also contemplated for setting the inertia value.

If the different is greater than the inertia value (decision block 418), the other access point is assigned to the client in an access point list which is configured for communication to the client (block 420). If not, however, another one of the clients is selected based on the order (block 412) and the process repeated (blocks 414-420). Although the procedure 400 of FIG. 4 described a process in which the client's experience with one or more access points 112(p) was improved the reassignment, a variety of other management goals may also be realized in conjunction with the management techniques previously described, an example of which is discussed in relation to the following figure.

Figure 5:
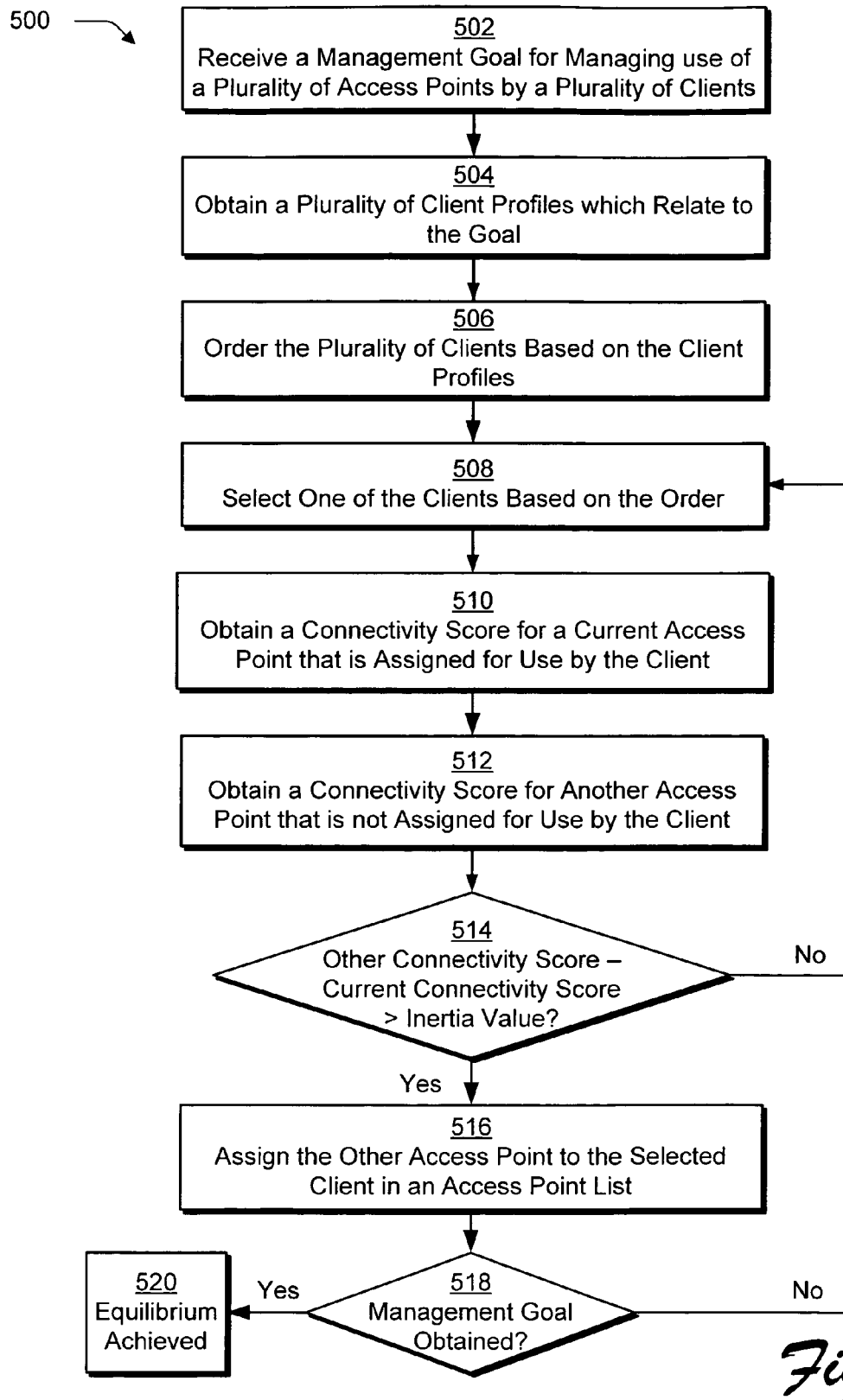
FIG. 5 is a flow diagram depicting a procedure in an exemplary implementation in which a management goal is set for implementation in conjunction with a business rule for management of a plurality of access points.

FIG. 5 is a flow diagram depicting a procedure 500 in an exemplary implementation in which a management goal is set for implementation in conjunction with a business rule for management of a plurality of access points. A management goal is received for managing use of a plurality of access points by a plurality of clients (block 502). For example, a network administrator may desire that a certain number of "hours of usage" be moved from an access point due to usage constraints, that a certain percentage of clients having the relatively worst connection experience (e.g., as represented by the client profiles) be reassigned to new access points, that a certain percentage of usage hours be moved to a new access point, and so on.

A plurality of client profiles is then obtained which relate to the goal (block 504). For example, client profiles which represent at least the certain percentage of clients having the relatively worst connection experience may be obtained. The plurality of client are then ordered based on the client profiles (block 506), from "worst" to "best". One of the clients is selected based on the order (block 508) and a connectivity score is obtained for a current access point that is assigned for use by the client (block 510). A connectivity score is also obtained for another access point that is not assigned for use by the client (block 512). For example, the "highest" connectivity score may be obtained which is not already assigned for use by the selected client. In this instance, the connectivity scores are numerical values such that a connectivity score having a larger positive number represents an access point that providers a better connectivity experience (as defined by the business rule 220) than a connectivity score for an access point which is lower.

Therefore, a determination is then made as to whether the current connectivity score, subtracted from the other connectivity score results in a value that is greater than an inertia value (decision block 514). If so, the other access point is assigned to the client in an access point list (block 516). If not, another one of the clients is selected (block 508) as previously described.

After the other access point is assigned, a determination is made as to whether the management goal has been obtained (decision block 518). For example, the management module 120 may determine if the certain number of "hours of usage" were moved, whether the certain percentage of clients having the relatively worst connection experience were reassigned to new access points, whether the certain percentage of usage hours were moved to a new access point, and so on. If not, the procedure may continue (blocks 508-516) until the management goal is obtained (decision block 518).

Once obtained, equilibrium is achieved (block 520) in the management of the plurality of access points 112(p). For example, the business rule 220 and its subsequent implementation by the connectivity score module 124 for calculating connectivity scores 224(d) for use in distributing access point listings 126(j) may cause the access points 112(p) to be utilized in a manner which reflects the considerations contemplated by a creator of the rule, e.g., a network administrator. Therefore, once the business rule 220 is implemented by the connectivity score module 124, use of the access points 112(p) by the plurality of clients 104(n) may be managed through use of the access point listings 126(j) provided to each of the clients 104(n).

It should also be noted that the use inertia value to limit "churn" of which access points 112(p) are assigned to which clients 104(n) may provide a variety of additional functionality. For example, in addition to ensuring that a reassignment is access points is made when a sufficient amount of "improvement" is possible, the inertial value 240 may also ensure that reassignments are not made singly for the reason of making a change. For example, the inertia value 240 may work over a period of time to implement the business rule 220 as clients become dissatisfied by the connectivity experience as indicated by the client profiles 218(b). Thus, the network administrator may set the management goal (block 502) and have the goal implemented without needless reassignment of "happy" clients. A variety of other instances are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system comprising a processor of a server and a storage device storing computer-executable instructions that, when executed, cause the processor of a service provider server to perform a method for access point management with a plurality of service provider access points, the method comprising:
   permitting an electronic device of a first client of a plurality of clients to connect with a particular access point of the plurality of service provider access points, the particular access point provides providing the electronic device with access to a wireless network via the service provider;
   generating a client profile for each client of the plurality of clients using information included in respective client logs associated with each client of the plurality of clients, wherein generating the client profiles comprises calculating a single numerical profile value describing a quality of connectivity experience for each client of the plurality of clients with one or more access points of the plurality of access points;
   generating a numerical connectivity score for each of the plurality of access points, wherein each respective numerical connectivity score is computed according to a business rule comprising a weighted value relating to access point cost and a weighted value relating to access point quality of service;
   determining that, for the particular access point of the plurality of access points, the first client of the plurality of clients has a first profile value less than a second profile value of a second client of the plurality of clients;
   selecting the first client based at least partly on determining that the first client has the first profile value less than the second profile value, wherein the first client profile indicates a lower numerical connectivity score being selected before one or more client profiles indicating a higher numerical connectivity score;
   determining that a difference between a numerical connectivity score for the particular access point and a numerical connectivity score for another one or more access points exceeds a defined value;
   permitting the electronic device to connect with another one or more access points based at least in part on the first profile value being less than the second profile value and the difference exceeding the defined value, the another one or more access points providing the electronic device with access to the wireless network via the service provider;
   forming an access point list, wherein forming the access point list includes selecting access points of the plurality of access points to include in the access point list based at least in part on the client profiles and the connectivity scores; and transferring the access point list to the electronic device via another one or more access points.

2. The system of claim 1, wherein when the difference does not exceed the defined value, the particular access point is not replaced by the another one or more access points in the access point list.

3. The system of claim 1, the method further comprising forming the access point list based at least partly on the difference exceeding the defined value, wherein the access point list references the another one or more access points and does not reference the particular access point.

4. The system of claim 1, wherein the business rule further includes one or more factors comprising:
   cost;
   quality of service;
   provider preference; and
   client state.

5. The system of claim 1, wherein the business rule defines an equilibrium for use of the plurality of access points by the plurality of clients.

6. The system of claim 1, wherein generating the client profiles comprises assigning a profile weight value to one or more items of the profile information.

7. The system of claim 6, wherein the numerical client profiles are generated based on the profile weight value, each numerical client profile being indicative of whether a client corresponding to the respective numerical client profile is happy or unhappy.

8. The system of claim 6, wherein a first weight value assigned to the descriptions of successful connection attempts for computing the numerical client profile differs from a second weight value assigned to the descriptions of successful connection attempts for computing the numerical connectivity score.

9. The system of claim 1, wherein the profile information used to generate the client profiles for each of the plurality of clients differs from information used to generate the numerical connectivity score.

10. A method of managing, with one or more processors of a service provider server, use of a plurality of service provider access points, the method comprising:
   creating one or more business rules, wherein the one or more business rules comprise at least a first factor and a second factor, wherein the first factor references an access point cost and the second factor references an access point quality, and the first factor and the second factor are each assigned a respective weight;
   processing data comprising descriptions of successful connection attempts from a plurality of client logs maintained by one or more clients, with the one or more processors, according to the one or more business rules, to achieve a respective connectivity score for each access point of the plurality of access points, wherein each connectivity score is indicative of a connectivity experience associated with a respective access point of the plurality of access points;
   generating, with the one or more processors, a respective client profile, for each of the one or more clients, using the descriptions of successful connection attempts included in the plurality of client logs and one or more client-specific profile factors, wherein generating the client profiles comprises calculating a single numerical profile value;
   permitting an electronic device of a particular client of the one or more clients to connect with a first access point of the plurality of service provider access points, the first access point providing the electronic device with access to a wireless network via the service provider server;
   selecting the particular client of the one or more clients based at least partly on a comparison between two or more of the client profiles;
   forming an access point list associated with the particular client, wherein:
      forming the access point list includes selecting access points of the plurality of access points to include in the access point list based at least in part on the client profiles and the connectivity scores, and
      the access point list identifies at least a second access point of the plurality of service provider access points, different from the first access point, based on a difference between a connectivity score of the first access point and a connectivity score of the second access point, the second access point providing access to the wireless network via the service provider server;
   permitting the electronic device to connect with the second access point based at least partly on the comparison between two or more of the client profiles and the difference between the connectivity score of the first access point and the connectivity score of the second access point, the second access point providing the electronic device with access to the wireless network via the service provider server; and
   transferring the access point list to the electronic device via the second access point.

11. The method of claim 10, wherein forming the access point list further comprises determining whether the difference between the connectivity score of the first access point and the connectivity score of the second access point exceeds a defined value.

12. The method of claim 10, further comprising forming the second connection at least partly in response to the difference exceeding a defined value.

13. The method of claim 10, wherein the one or more business rules further comprise one or more factors selected from a group comprising:
   cost;
   quality of service;
   provider preference; and
   client state.

14. The method of claim 10, further comprising:
   selecting the particular client based at least partly on the profile value of the particular client being lower than a profile value of an additional client; and
   permitting the electronic device to connect with the first access point based at least partly on the first access point having a higher connectivity score than a connectivity score for the second access point.

15. A method comprising:
   creating, by a processor of a computing device, a business rule, wherein the business rule comprises a first connectivity factor and a second connectivity factor, wherein the first connectivity factor references a cost of providing an access point of a plurality of access points of the computing device, and the second connectivity factor references a quality of connectivity of the access point;
   assigning a first weight to the first connectivity factor and a second weight to the second connectivity factor;

obtaining a plurality of client logs formed and maintained by a respective plurality of clients, the plurality of client logs comprising data including profile factors corresponding to an experience with the plurality of access points by the respective plurality of clients, the profile factors describing a successful connection attempt between at least one client of the plurality of clients and at least one access point of the plurality of access points;

generating a client profile for each client of the plurality of clients using the profile factors of the plurality of client logs and a profile factor weight assigned to one or more of the profile factors, wherein generating the client profiles comprises calculating a single numerical profile value;

permitting an electronic device of a particular client of the plurality of clients to connect with a first access point of the plurality of access points, the first access point providing the electronic device with access to a wireless network via the computing device;

selecting the particular client based at least partly on a comparison between two or more of the client profiles;

applying the business rule and an inertia value to the client profiles, and to the first and second connectivity factors, wherein the applying of the business rule and the inertia value causes the computing device to
generate a first numerical connectivity score for the first access point and a second numerical connectivity score for a second access point of the plurality of access points different from the first access point;

forming an access point list, wherein forming the access point list includes selecting access points of the plurality of access points to include in the access point list based at least in part on the client profiles and the connectivity scores;

permitting the electronic device to connect with the second access point based at least in part on a difference between the first connectivity score and the second connectivity score and the comparison between two or more of the client profiles, the second access point providing the electronic device with access to the wireless network via the computing device; and transferring the access point list to the electronic device via the second access point.

16. The method of claim 15, wherein the applying is performed to obtain an equilibrium of use of the plurality of access points by the plurality of clients.

17. The method of claim 15, wherein the applying further comprises determining whether the difference exceeds the inertia value.

18. The method of claim 15, wherein the business rule further comprises one or more factors comprising:
cost;
quality of service;
provider preference; and
client state.

19. The method of claim 15, further comprising forming the second connection at least partly in response to the difference exceeding the inertia value.

20. The method of claim 15, further comprising:
determining that a client profile of the particular client is lower than a client profile of an additional client; and
selecting the particular client based at least partly on determining that the client profile of the particular client is lower than the client profile of the additional client.

* * * * *